US006912963B2

(12) United States Patent
Bassett

(10) Patent No.: US 6,912,963 B2
(45) Date of Patent: Jul. 5, 2005

(54) APPARATUS FOR PREPARING SOIL FOR THE PLACEMENT OF SEED AND ADDITIVE

(76) Inventor: James H. Bassett, 812 Somonauk St., Sycamore, IL (US) 60178

( * ) Notice: Subject to any disclaimer, the term of this patent is extended or adjusted under 35 U.S.C. 154(b) by 0 days.

(21) Appl. No.: 10/705,311

(22) Filed: Nov. 10, 2003

(65) Prior Publication Data

US 2004/0094079 A1 May 20, 2004

Related U.S. Application Data

(63) Continuation of application No. 08/073,573, filed on Jun. 8, 1993, now Pat. No. 6,644,224.

(51) Int. Cl.$^7$ ................................................. A01C 5/00
(52) U.S. Cl. ........................ 111/163; 172/559; 172/561; 172/562; 172/604; 111/169; 111/52
(58) Field of Search .................................. 111/139, 140, 111/157, 163, 167, 169, 164, 165, 166, 52; 172/558, 559, 560, 561, 562, 604

(56) References Cited

U.S. PATENT DOCUMENTS

| | | | | | |
|---|---|---|---|---|---|
| 1,260,752 A | * | 3/1918 | Casaday | ...................... | 172/559 |
| 1,321,040 A | * | 11/1919 | Hoffman | ...................... | 172/187 |
| 1,391,593 A | * | 9/1921 | Sweeting | ..................... | 172/187 |
| 1,791,462 A | * | 2/1931 | Bermel | ........................ | 172/559 |
| 4,142,589 A | * | 3/1979 | Schlagenhauf | .............. | 172/510 |
| 4,187,916 A | * | 2/1980 | Harden et al. | ............... | 172/146 |
| 4,206,817 A | * | 6/1980 | Bowerman | .................. | 172/559 |
| 4,241,674 A | | 12/1980 | Mellinger | ..................... | 111/52 |
| 4,377,979 A | | 3/1983 | Peterson et al. | ............. | 111/140 |
| 4,407,371 A | | 10/1983 | Hohl | ............................ | 111/140 |
| 4,550,122 A | | 10/1985 | David et al. | ................. | 111/143 |
| 4,603,746 A | * | 8/1986 | Swales | ........................ | 172/559 |
| 4,669,550 A | * | 6/1987 | Sittre | .......................... | 172/559 |
| 4,785,890 A | | 11/1988 | Martin | ........................ | 172/546 |
| 5,076,180 A | | 12/1991 | Schneider | .................... | 111/139 |
| 5,129,282 A | | 7/1992 | Bassett et al. | .............. | 111/139 |
| 5,255,617 A | | 10/1993 | Williams et al. | ............ | 111/140 |
| 5,341,754 A | | 8/1994 | Winterton | .................... | 111/139 |
| 5,443,125 A | * | 8/1995 | Clark et al. | .................. | 172/608 |
| 5,477,792 A | * | 12/1995 | Bassett et al. | .............. | 111/121 |
| 5,640,914 A | * | 6/1997 | Rawson | ...................... | 111/140 |
| 5,657,707 A | * | 8/1997 | Dresher et al. | ............. | 111/139 |
| 5,660,126 A | * | 8/1997 | Freed et al. | ................. | 111/140 |
| 5,685,245 A | * | 11/1997 | Bassett | ......................... | 111/62 |
| 5,709,271 A | * | 1/1998 | Bassett | ........................... | 172/4 |
| 5,878,678 A | * | 3/1999 | Stephens et al. | ............ | 111/139 |
| 5,970,892 A | * | 10/1999 | Wendling et al. | ........... | 111/139 |
| 6,575,104 B2 | * | 6/2003 | Brummelhuis | .............. | 111/139 |
| 6,644,224 B1 | | 11/2003 | Bassett | ........................ | 111/157 |

FOREIGN PATENT DOCUMENTS

| SU | 392897 | 8/1973 |
|---|---|---|
| SU | 1410884 | 7/1988 |

OTHER PUBLICATIONS

Farm Journal Article, "Listen to your soil", pp. 14–15, Jan. 1993.

* cited by examiner

*Primary Examiner*—Victor Batson
(74) *Attorney, Agent, or Firm*—Jenkens & Gilchrist

(57) ABSTRACT

An apparatus for preparing soil for the placement therein of at least one of seed and fertilizer. A frame is provided with there being first structure on the frame for penetrating the soil to create an opening for at least one of seed and fertilizer as the frame is advanced in a travel direction. A second structure is provided on the frame at least partially downstream of the first structure for at least one of a) stripping soil clods from the first structure and b) loosening soil downstream of the first structure.

20 Claims, 2 Drawing Sheets

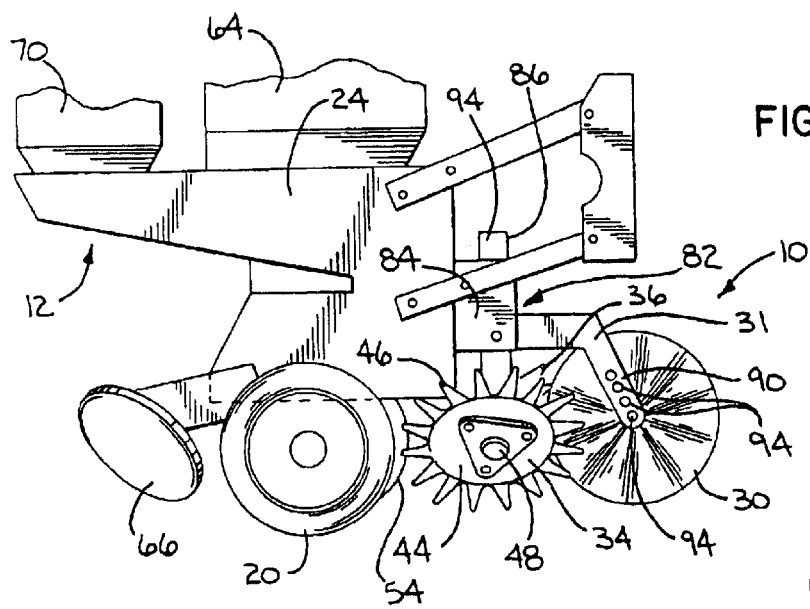
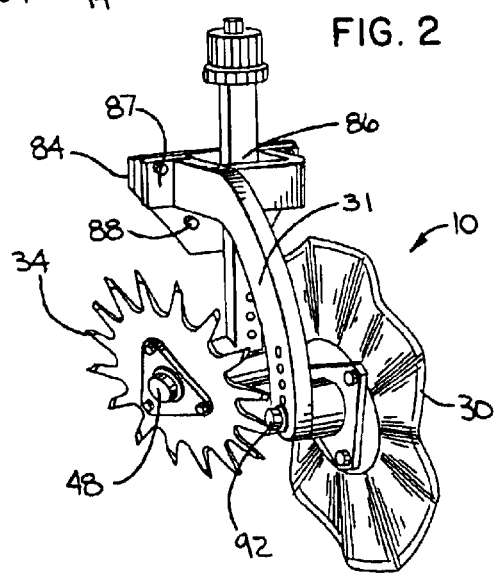
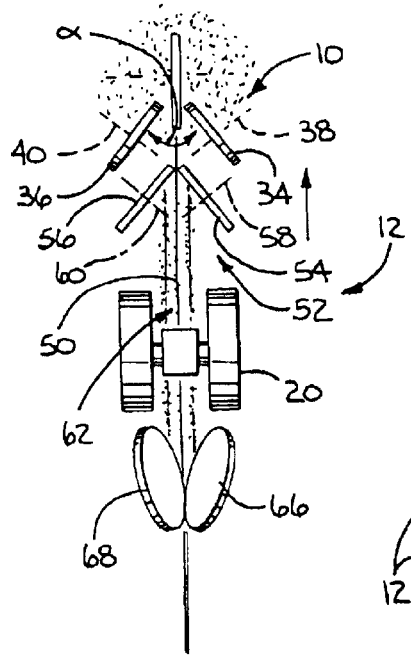
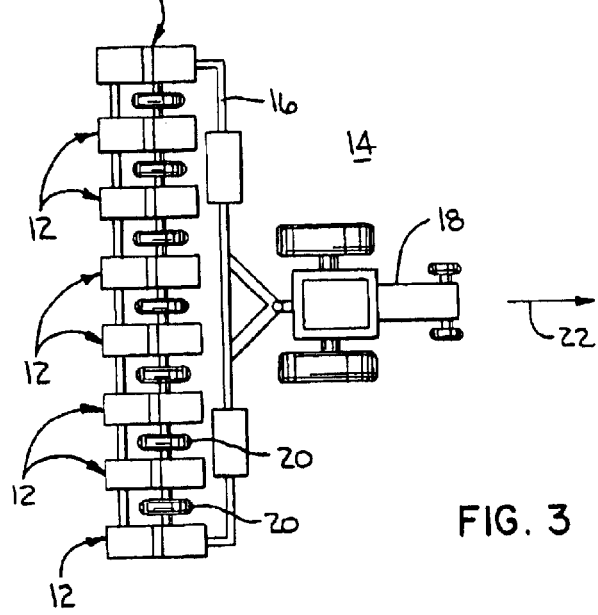

APPARATUS FOR PREPARING SOIL FOR THE PLACEMENT OF SEED AND ADDITIVE

CROSS-REFERENCE TO RELATED APPLICATION

This application is a continuation of U.S. patent application Ser. No. 08/073,573 filed Jun. 8, 1993 now U.S. Pat. No. 6,644,224, for "Apparatus for Preparing Soil for the Placement of Seed and Additive."

FIELD OF THE INVENTION

This invention relates to agricultural equipment and, more particularly, to an apparatus that simultaneously clears residue and loosens soil so that seed and fertilizer can be placed therein in such a manner that consistent and optimum growing conditions can be established for the seed.

BACKGROUND OF THE INVENTION

There are many planting techniques currently practiced by farmers. Under a conventional process, planting of a field is carried out in steps. First, the entire field is worked to break up the soil, break loose the residue from the preceding year's crops, and break down and work the residue into the tilled soil. The planting rows in the prior year are eliminated so that the entire field has a substantially homogenous soil texture.

This conventional technique has numerous drawbacks. First of all, this technique requires the performance of multiple steps to effect planting of the field. The field is first cultivated during one or more passes of a cultivator over the field. A separate planter attachment is then utilized to deposit seed and spray fertilizer in an entirely separate operation. To carry out the different operations, the user is required to connect and disconnect equipment to and from towing vehicle.

A further problem with this conventional technique is that the residue, such as corn stalks, may not be effectively pulverized, even though several passes are made over the field with the cultivator unit. The result is that the residue may jam up in the planter unit and/or block the placement of the seed and spraying of fertilizer.

A further problem with this conventional technique is that cultivation of the entire field increases soil erosion from both rain and wind. Not only is this undesirable from the standpoint of loosing fertile soil, but of late the federal government has imposed restrictions on erosion by requiring that a certain amount of ground cover remain in place at all times in the field.

Certain of these problems led to the development of residue clearing devices which facilitate the planting of seed without prior cultivation. The John Deere Company, for one, has been active in the development of such residue clearing devices. One such structure currently offered by John Deere has a cooperating pair of rotary wheels. The wheels are constructed from flat steel plate material and have a solid central body with radially projecting teeth spaced equidistantly about the periphery of the body. A highly successful wheel design is commercially available through the assignee herein under the trademark TRASHWHEEL™. Each wheel pair is mounted on a planter frame so that the teeth on the wheel pair are in mesh, with the wheels toed in at their bottoms and diverging away from each other in a trailing direction. The angular relationship of the wheels results in their being automatically rotated as they engage with and are dragged through soil in operation.

The wheels are oriented so that they resituate residue in the planting row upstream of a "V-opener", which defines an open seed slot. The frame that carries the wheels also carries a supply of fertilizer and/or seed, with the seed being deposited in the open slot as the frame is advanced. Once the seed is placed, a downstream pair of closing wheels redeposits soil in the slot created by the V-opener.

Heretofore, the residue clearing wheels have been operated at a depth so as not to penetrate as deeply as the seed slot. Consequently, the V-opener operates on primarily unloosened soil. In moist soil, the V-openers tend to create the slot primarily by compaction of the soil against the walls bounding the slot. When the closing wheels replace soil in the seed slot, much of the soil remains in a compacted state at the walls. The result is that less loose soil than is desirable is placed back in the slot.

As a consequence of this, the seed may not be fully covered or covered with only a thin layer of soil. Alternatively, even if the seed is initially covered with soil by the closing wheels, the soil, upon drying out, tends to develop cracks through which the seed is directly exposed to the elements. The seed may be destroyed by, for example, direct exposure to the sun. Alternatively, if fertilizers are subsequently placed on the sod, the fertilizer may be applied in substantial quantities directly upon the seed, with adverse results.

Heretofore, since there has been no practical solution to the above problem, those in the art have merely contended with this problem. The result of this is that crop quality and quantity are often significantly compromised. This is particularly a problem in today's environment in which it is imperative that yield be maximized for farmland.

SUMMARY OF THE INVENTION

The present invention is specifically directed to overcoming the above-enumerated problems in a novel and simple manner.

According to the invention, an apparatus is provided for preparing soil for the placement therein of at least one of seed and fertilizer. A frame is provided with there being first structure on the frame for penetrating the soil to create an opening for at least one of seed and fertilizer as the frame is advanced in a travel direction. A second structure is provided on the frame at least partially downstream of the first structure for at least one of a) stripping soil clods from the first structure and, b) loosening soil downstream of the first structure.

With this arrangement, a loosened bed of soil, with a relatively uniform consistency, can be defined for receipt of at least one of the seed and fertilizer.

In one form, the first structure is a coulter, which may be in the form of a wheel. A preferred form of wheel is one of a 13-wave, 8-wave and a rippled construction wheel.

Similarly, the second structure can be in the form of a wheel and, is preferably in the form of a cooperating pair of second and third wheels, with the first wheel rotatable about a horizontally extending axis and the second and third wheels rotatable about axes that are transverse to each other and the first wheel axis.

In one form, at least one of the second and third wheels traces a path that coincides with the first wheel along the line of the travel direction of the frame.

In one form, the frame has a main part and a subpart, with the subpart being selectively adjustable in a vertical direction relative to the main frame part so that the vertical position of the second and third wheels relative to the first wheel can be changed.

Similarly, the first wheel can be mounted to the frame for vertical movement relative thereto. Consequently, the vertical positions of the first, second and third wheels on the frame can be selected by the user, with the second and third wheels being movable vertically in turn relative to the first wheel.

In one form, the second and third wheels are arranged so that the planes of rotation thereof cooperatively define a "V" shape opening away from the travel direction. By placing the second and third wheels in straddling relationship to the first wheel, the second and third wheels will pick clean clods of soil that may be adhered to the first wheel and break up soil clods that may be thrown by the coulter wheel in operation.

The invention further contemplates the above structure in combination with a fourth structure on the frame for continuously defining an open slot in soil loosened by the first and second structures as the frame advances in a travel direction.

In one form, the first and second structures penetrate soil to a depth approximately equal to the depth of a slot in soil defined by the fourth structure. This depth can be slightly less than, equal to, or slightly greater than the depth of the seed slot.

The invention further contemplates the combination of the above structure with a fifth structure on the frame for continuously delivering at least one of seed and fertilizer to soil and a sixth structure for continuously replacing soil in a slot defined by the fifth structure as the frame is advanced in a travel direction.

The invention still further contemplates an apparatus for preparing soil for the placement therein of at least one of seed and fertilizer, which apparatus has a frame, first structure on the frame for continuously parting the soil in an intended line of introduction of at least one of seed and fertilizer, and second structure on the frame for loosening soil adjacent to the intended line of introduction of at least one of seed and fertilizer.

The invention further contemplates an apparatus for preparing soil, as described above, including a frame with first and second cooperating, toothed wheels mounted to the frame so that the first and second toothed wheels rotate in first and second vertically extending planes about first and second transverse axes to loosen soil. Structure is provided for supporting the frame at a predetermined height relative to subjacent soil supporting the frame. Structure is additionally provided on the frame for continuously defining an open slot in, or in the vicinity of, soil loosened by the first and second wheels as the frame is advanced in a travel direction. The frame supporting structure maintains the frame at a predetermined height so that the slot defining structure defines a slot having a first depth. At least one of the first and second wheels penetrates soil to a depth at least equal to approximately the first depth.

Preferably, both the first and second wheels penetrate soil to at least the first depth.

The invention also contemplates a method of preparing soil for placement of at least one of seed and fertilizer therein, which method includes the steps of: continuously cutting the soil in an intended line for the placement of at least one of seed and fertilizer; continuously loosening the soil on opposite sides of the intended seed line; and continuously defining an open slot for the placement of at least one of seed and fertilizer in, or in the vicinity of, the loosened soil.

BRIEF DESCRIPTION OF THE DRAWINGS

In the drawings:

FIG. 1 is a side elevation view of a soil treating implement including an apparatus for preparing soil for the placement of seed and fertilizer, according to the present invention;

FIG. 2 is an enlarged, perspective view of the inventive apparatus;

FIG. 3 is a schematic, plan view of a towing vehicle attached operatively to a plurality of implements, as shown in FIG. 1;

FIG. 4 is a schematic, plan view of the implement in FIG. 1;

DETAILED DESCRIPTION OF THE ILLUSTRATED EMBODIMENT

Figure 5:
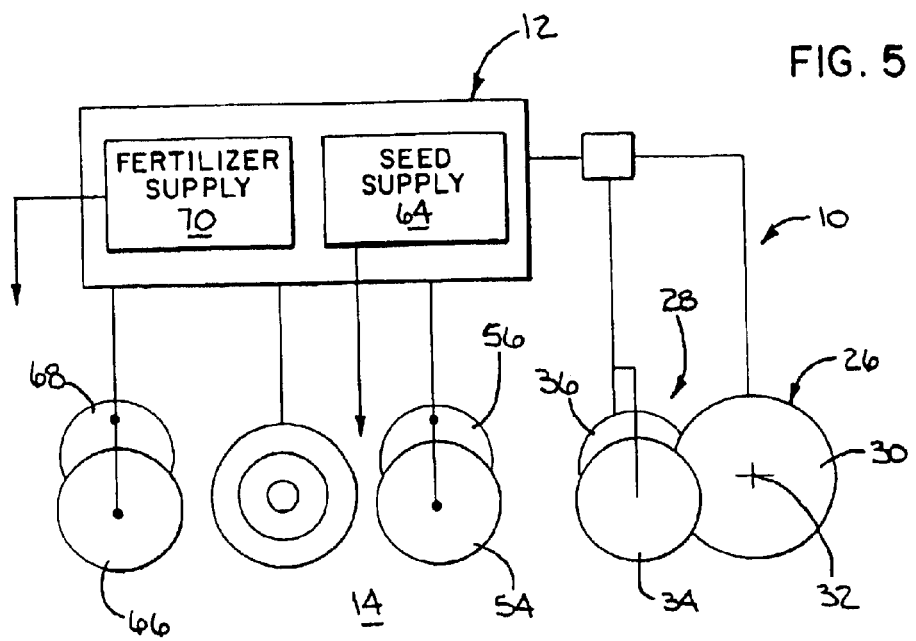
FIG. 5 is a schematic, side elevation view of the implement in FIG. 1.
Figure 6:
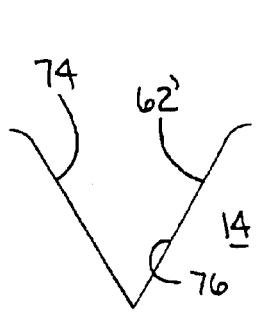
FIG. 6 is a cross-sectional view of a slot formed in a conventional manner.
Figure 7:
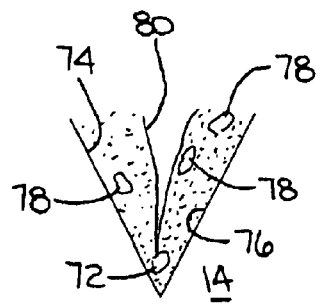
FIG. 7 is a view of the slot as in FIG. 6 with a seed therein and soil replaced in the slot in conventional manner.

In FIGS. 1–5, an apparatus for preparing soil for the placement of seed and fertilizer, according to the present invention, is shown at 10. The inventive apparatus 10 is part of a multi-function implement at 12 which, in one pass over a field, prepares the underlying soil 14 for planting, opens the soil 14 for placement of seed, places the seed, resituates the soil around the seed, and applies a fertilizer.

In normal operation, a plurality of the implements 12 are mounted to a towing frame at 16 that is drawn by a towing vehicle 18, which is in the form of a tractor. The implements 12 are operatively connected to the frame 16 in side-by-side relationship and are mobilized by gauge wheels 20, which in addition to facilitating movement of the implements 12 in the forward direction of travel for the towing vehicle 18, as indicated by arrow 22, maintain the frame 24 on each implement 12 at a predetermined height relative to subjacent soil 14 over which the implements 12 are moved.

The inventive apparatus 10 consists of a first means at 26 for penetrating/parting the soil and second means at 28, at least partially downstream of the first means 26, for loosening soil downstream of the first means 26, stripping soil clods that may accumulate on the first means 26, and breaking up soil clods that may be thrown by the first means 26.

While the first means 26 could take any of a number of different forms, in one preferred form, the first means 26 is a coulter wheel 30 that is mounted to a depending arm 31 on the implement frame 24 for rotation about a horizontal axis 32 that is substantially perpendicular to the direction of travel of the towing vehicle 18 and the implements 12 carried thereby. The coulter wheel 30 can take a number of different forms. For example, it could be a 13-wave, an 8-wave, or a ripple construction, known to those skilled in the agricultural art. This type of wheel has a width on the order of one inch.

The second means 28 consists of second and third wheels 34, 36, which are rotatable about axes 38, 40, respectively. The wheels 34, 36 each have a cylindrical body 44 from which equidistantly spaced teeth 46 project in cantilever fashion. A highly preferred construction for these wheels is embodied in a product currently being sold by the assignee herein under the trademark TRASHWHEEL™.

A hub assembly 48 mounts each of the wheels 34, 36 to the implement frame 24 so that the planes of rotation of the wheels 36, 38 define a "V" shape within an included angle a on the order of 30–40 degree. The wheels 34, 36 are toed in slightly at the bottom portions thereof. With this arrangement, as the wheels 34, 36 are dragged through the soil 14, they are automatically rotated. As this rotation occurs, the wheels 34, 36 redistribute residue laterally to the sides of an intended seed line and at the same time pulverize and provide a loosened bed of soil to the sides of the seed line 50. With the residue cleared, a uniform height path is created for the gauge wheels 20 so that the implement frame 24 runs at a consistent height relative to the underlying soil 14.

In addition to loosening the soil 14, the wheels 34, 36 perform a cleaning function for the coulter wheels 30. To accomplish this latter function, the wheels 34, 36 are arranged to straddle the trailing end of the coulter wheel 30 so that there is overlap in the line of travel. The coulter wheel 30 tends to pick up soil clods and either throw them into the implements 12 or propel them randomly within the field. With the wheels 34, 36 situated according to the present invention, the wheels 34, 36 intercept any clods at the point that they normally separate from the coulter wheel 30 and break up the clods to cause an even distribution thereof over the field. The wheels 34, 36 additionally tend to scrape loose any large clods that hang up on the coulter wheel 30.

Downstream of the wheels 34, 36 a V-opener is provided at 52. The V-opener 52 consists of cooperating disks 54, 56 which are toed in at their bottom portions and freely rotatable about transverse axes 58, 60. As the implement 12 advances, the disks 54, 56 cooperate to define a V-shaped, upwardly opening seed slot 62 in the soil 14.

Once the slot 62 is formed, seed from a supply 64 on the implement 12 is directed by gravity into the slot 62. Thereafter, a cooperating pair of closing wheels/disks 66, 68, of a conventional construction, direct soil back into the slot 62 to cover the seed therein and effect a slight compaction of the soil 14. The wheels/disks 66, 68 are arranged to converge from top to bottom and are toed in slightly at the trailing ends thereof so that the wheels/disks 66, 68 rotate on their own as they are advanced over the soil 14.

Fertilizer from a supply 70 can then be sprayed over the soil 14 with the, seed therein to complete the operations performed by the implement 12.

Figure 8:
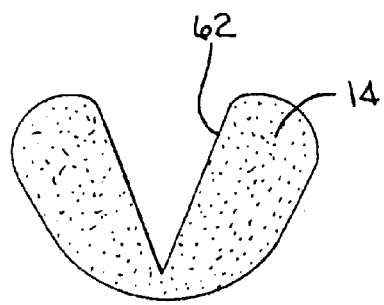
FIG. 8 is a cross-sectional view of a slot made according to the present invention.
Figure 9:
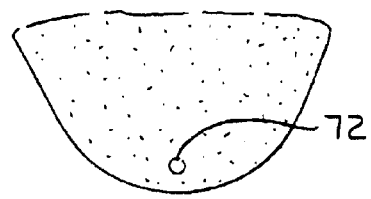
FIG. 9 is a view as in FIG. 8 with a seed in the slot and the soil replaced according to the invention.

One advantage of the present invention affords over the prior art can be seen by comparing the seed slot 62 in FIGS. 8 and 9 formed according to the present invention, versus the seed slot 62' formed using conventional techniques. With the invention, the coulter wheel 30 parts the soil 14 preferably to the depth at which the individual seeds 72 are to be placed. The following wheels 34, 36 break up soil and define a relatively large, U-shaped base of loosened soil 14 at, or in the vicinity of, the soil parting line. Consequently, when the V-opener 52 engages the loosened soil 14 or soil in the vicinity of the loosened soil, the soil 14 redistributes readily without significant compaction. For example, as shown in FIG. 8, the loosened soil 14 can spill laterally outwardly and mound at the sides of the slot 62. The closing wheels 66, 68 then place the loosened soil back into the slot 62 so that the seed 72 is covered by a substantial depth of loosened soil. Consequently, the likelihood of exposure of the seed 72 is minimal, even after the loosened soil shrinks after being completely dried out.

The loosened soil 14 provides an excellent receptacle for liquid fertilizer or other treating liquid. The loosened sod is relatively homogeneous and effectively absorbs and retains the liquid.

On the other hand, by forcing the V-opener 52 through the soil 14 before any pre-treatment, by the conventional technique, the walls 74, 76 of the slot 621 are significantly compacted. At the same time, the moistened soil gets smeared on the side walls 74 9 76, so as to make a relatively hard receptacle for the incoming seed 72.

Since much of the soil 14 is compacted, when the closing wheels 66, 68 encounter the soil 14, very little of the soil 14 may be available to be placed back into the slot 62'. That portion of the soil 14 that does find its way back into the slot 62' may include clumps 78 which bridge the walls 74, 76 and may preclude complete covering of the seed 72 by soil. Still further, the small amount of soil 14 within the slot 62', upon drying out, may develop cracks 80, whereby the seed 72 at the bottom of the slot 62' is fully exposed to the elements. The seed 72 is thus prone to being destroyed, as by sunlight, fertilizer from the supply 70 during the planting process, or by water which may float the seed 72 to be improperly positioned in the slot 62' or completely out of the slot 62'.

The invention contemplates that the coulter wheel 30 and second and third wheels 34, 36 be vertically repositionable. To accomplish this, the frame 24 includes a frame subassembly 82 consisting of a main frame part 84 and a subpart 86. The main frame part 84 has a mounting bracket 87 held removably in an operative position on the implement 12 by bolts 88.

The arm 31 is integrally formed with the bracket 87 and is a fixed part of the frame 24. The arm 31 has a depending length 90 to which the coulter wheel 30 is attached by a bolt 92. The arm length 90 has a plurality of vertically spaced bores 94 to accept the bolt 92 and thereby mount the coulter wheel 30 in a plurality of different positions on the frame 24. Since the position of the gauge wheels 20 relative to the frame 24 is fixed, the depth of the coulter wheel penetration is determined by this adjustment. Preferably, the range of adjustment is such that the coulter wheel 30 can be situated to make a shallow cut and also to make a cut significantly deeper than the desired seed depth.

The frame subpart 86 connects to the bracket for controlled vertical movement relative thereto. The frame subpart 86 is in the form of a vertically extending stem 94, at the bottom of which the wheels 34, 36 are mounted. A suitable connection for adjustably mounting the stem 94 to the bracket 87 is described fully in my U.S. Pat. No. 5,129,282, which is incorporated herein by reference. The range of adjustment for the wheels 34, 36 is preferably between a position wherein the wheels 34, 36 skim the soil 14 to a position wherein the wheels 34, 36 penetrate to a depth below the planting depth for the seed 72.

With the inventive structure, the seed 72 is consistently and safely encapsulated in soil 14. Liquid fertilizer, or the like, can be held captive in the loosened, homogenous soil. Consequently, predictable, optimum crop yield will result.

The foregoing disclosure of specific embodiments is intended to be illustrative of the broad concepts comprehended by the invention.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An apparatus for preparing soil to be planted, said apparatus comprising:
    a frame having a front and rear;
    a coulter wheel mounted on the frame at an elevation at which said coulter wheel penetrates the soil as the frame is advanced in a travel direction over the soil; and
    at least one toothed wheel rotatably mounted on the frame and engaging the soil, a portion of said toothed wheel extending rearwardly of said coulter wheel with respect to said travel direction, and a forward portion of said toothed wheel overlapping a rear portion of said coulter wheel to strip soil clods from said coulter wheel.

2. The apparatus of claim 1 wherein said toothed wheel is angled to redistribute residue laterally from said opening created by said coulter wheel with the overlapping portion of said toothed wheel converging toward said coulter wheel so that the tips of the teeth are closest to said coulter wheel.

3. The apparatus of claim 2 wherein said toothed wheels are both angled to redistribute residue laterally from said opening created by said coulter wheel with the overlapping portion of said toothed wheel converging toward said coulter wheel so that the tips of the teeth are closest to said coulter wheel.

4. The apparatus of claim 1 which includes a pair of said toothed wheels.

5. The apparatus of claim 1 wherein said coulter wheel has a central axis and said toothed wheel resides substantially entirely rearwardly of said central axis of the coulter wheel.

6. The apparatus of claim 1 wherein said coulter wheel is one of a wave and a ripple construction.

7. The apparatus of claim 1 in combination with a pair of discs mounted on the frame for continuously defining an open slot in the soil for receipt of at least one of seed and fertilizer as the frame advances in a travel direction.

8. The apparatus of claim 7 in combination with a seed supply mounted on the frame for continuously delivering at least one of seed and fertilizer to soil and a pair of closing wheels mounted on the frame for continuously placing soil in said slot as the frame is advanced in a travel direction.

9. A method of preparing soil to be planted, said method comprising:
    traversing the soil with a frame carrying
    a rotatable coulter wheel mounted at an elevation at which said coulter wheel penetrates the soil as the frame is advanced in a travel direction over the soil, and
    at least one toothed wheel rotatably mounted on the frame, a portion of said toothed wheel extending rearwardly of said coulter wheel with respect to said travel direction, and a forward portion of said toothed wheel overlapping a rear portion of said coulter wheel to strip soil clods from said coulter wheel, said toothed wheel being mounted at an elevation at which said toothed wheel engages the soil to redistribute residue on the soil.

10. The method of claim 9 wherein said toothed wheel is angled to redistribute residue laterally from said opening created by said coulter wheel with the overlapping portion of said toothed wheel converging toward said coulter wheel so that the tips of the teeth are closest to said coulter wheel.

11. The method of claim 9 which includes a pair of said toothed wheels.

12. The method of claim 11 wherein said toothed wheels are both angled to redistribute residue laterally from said opening created by said coulter wheel with the overlapping portion of said toothed wheel converging toward said coulter wheel so that the tips of the teeth are closest to said coulter wheel.

13. The method of claim 9 wherein said coulter wheel has a central axis and said toothed resides substantially entirely rearwardly of said central axis of the coulter wheel.

14. The method of claim 9 wherein said coulter wheel is one of a wave and a ripple construction.

15. The method of claim 9 which includes continuously forming an open slot in the soil behind the toothed wheel for receipt of at least one of seed and fertilizer as the frame advances in a travel direction.

16. The method of claim 15 which includes continuously delivering at least one of seed and fertilizer to soil and a pair of closing wheels mounted on the frame for continuously placing soil in said slot as the frame is advanced in a travel direction.

17. An apparatus for preparing soil to be planted, said apparatus comprising:
    a frame having a front and rear;
    a coulter wheel mounted on the frame at an elevation at which said coulter wheel penetrates the soil as the frame is advanced in a travel direction over the soil; and
    at least one toothed wheel rotatably mounted on the frame and engaging the soil, said toothed wheel overlapping a rear portion of said coulter wheel to strip soil clods from said coulter wheel and tracing a path in rotation bounded by a plane that intersects said coulter wheel.

18. A method of preparing soil to be planted, said method comprising:
    traversing the soil with a frame carrying a rotatable coulter wheel mounted at an elevation at which said coulter wheel penetrates the soil as the frame is advanced in a travel direction over the soil, and
    at least one toothed wheel rotatably mounted on the frame and overlapping a rear portion of said coulter wheel to strip soil clods from said coulter wheel and tracing a path in rotation bounded by a plane that intersects said coulter wheel, said toothed wheel being mounted at an elevation at which said toothed wheel engages the soil to redistribute residue on the soil.

19. An apparatus for preparing soil to be planted, said apparatus comprising
    a frame having a first portion adapted to mount a rotatable coulter wheel at an elevation at which said coulter wheel penetrates the soil as the frame is advanced in a travel direction over the soil, and a second portion adapted to mount at least one rotatable toothed wheel in a position at which said toothed wheel engages the soil as the frame is advanced in a travel direction over the soil, with a portion of said toothed wheel extending rearwardly of said coulter wheel with respect to said travel direction, and a forward portion of said toothed wheel overlapping a rear portion of said coulter wheel to strip soil clods from said coulter wheel,
    a coulter wheel adapted to be mounted on said first portion of said frame, and
    at least one toothed wheel adapted to be mounted on said second portion of said frame.

20. A method of preparing soil to be planted, said method comprising
    providing a frame having a first portion adapted to mount a rotatable coulter wheel at an elevation at which said coulter wheel penetrates the soil as the frame is advanced in a travel direction over the soil, and a second portion adapted to mount at least one rotatable toothed wheel in a position at which said toothed wheel engages the soil as the frame is advanced in a travel direction over the soil, with a portion of said toothed wheel extending rearwardly of said coulter wheel with respect to said travel direction, and a forward portion of said toothed wheel overlapping a rear portion of said coulter wheel to strip soil clods from said coulter wheel, providing a coulter wheel adapted to be mounted on said first portion of said frame, and providing at least one toothed wheel adapted to be mounted on said second portion of said frame.

* * * * *

(12) EX PARTE REEXAMINATION CERTIFICATE (9731st)
United States Patent
Bassett

(10) Number: US 6,912,963 C1
(45) Certificate Issued: Jun. 28, 2013

(54) APPARATUS FOR PREPARING SOIL FOR THE PLACEMENT OF SEED AND ADDITIVE

(76) Inventor: James H. Bassett, Sycamore, IL (US)

Reexamination Request:
No. 90/012,458, Aug. 31, 2012

Reexamination Certificate for:
Patent No.: 6,912,963
Issued: Jul. 5, 2005
Appl. No.: 10/705,311
Filed: Nov. 10, 2003

Related U.S. Application Data

(63) Continuation of application No. 08/073,573, filed on Jun. 8, 1993, now Pat. No. 6,644,224.

(51) Int. Cl.
*A01B 63/00* (2006.01)

(52) U.S. Cl.
USPC ............ 111/163; 111/52; 111/169; 172/559; 172/561; 172/562; 172/604

(58) Field of Classification Search
None
See application file for complete search history.

(56) References Cited

To view the complete listing of prior art documents cited during the proceeding for Reexamination Control Number 90/012,458, please refer to the USPTO's public Patent Application Information Retrieval (PAIR) system under the Display References tab.

*Primary Examiner* — Jeffrey L. Gellner

(57) ABSTRACT

An apparatus for preparing soil for the placement therein of at least one of seed and fertilizer. A frame is provided with there being first structure on the frame for penetrating the soil to create an opening for at least one of seed and fertilizer as the frame is advanced in a travel direction. A second structure is provided on the frame at least partially downstream of the first structure for at least one of a) stripping soil clods from the first structure and b) loosening soil downstream of the first structure.

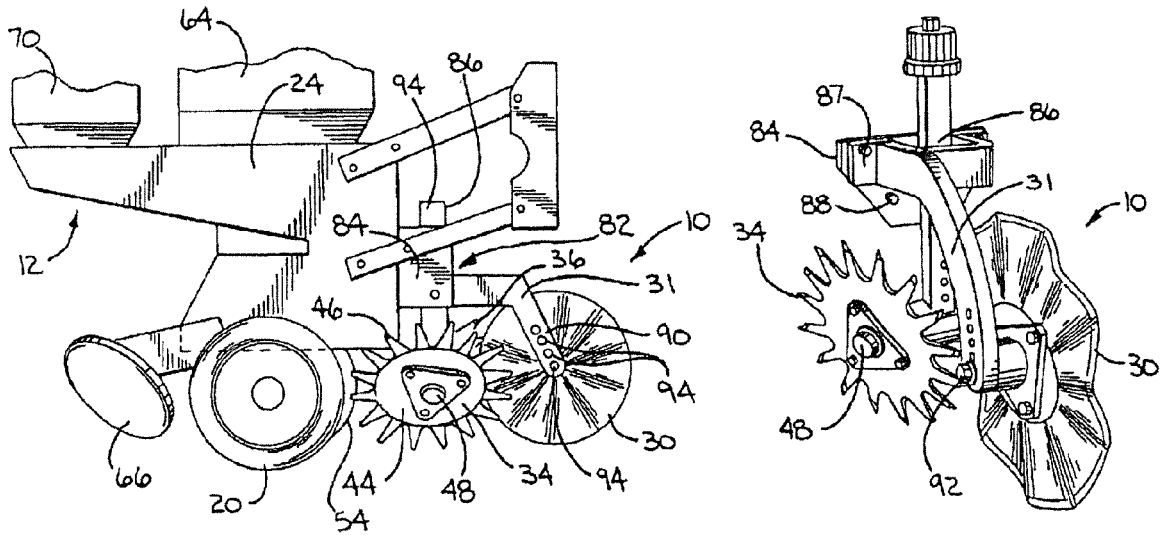

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 2, 4, 5, 9-12, 17 and 18 is confirmed.

Claims 3, 6-8, 13-16, 19 and 20 were not reexamined.

* * * * *